(12) United States Patent
Hemphill et al.

(10) Patent No.: US 11,901,134 B2
(45) Date of Patent: Feb. 13, 2024

(54) FORMATION OF CONDUITS IN POROUS CAPACITOR ELECTRODES

(71) Applicant: Pacesetter, Inc., Santa Clara, CA (US)

(72) Inventors: Ralph Jason Hemphill, Sunset, SC (US); David R. Bowen, Taylors, SC (US); Thomas F. Strange, Easley, SC (US); Xiaofei Jiang, Clemson, SC (US)

(73) Assignee: Pacesetter, Inc., Santa Clara, CA (US)

( * ) Notice: Subject to any disclaimer, the term of this patent is extended or adjusted under 35 U.S.C. 154(b) by 687 days.

(21) Appl. No.: 17/103,939

(22) Filed: Nov. 24, 2020

(65) Prior Publication Data

US 2021/0082628 A1    Mar. 18, 2021

Related U.S. Application Data

(62) Division of application No. 15/728,313, filed on Oct. 9, 2017, now abandoned.

(51) Int. Cl.

| H01G 9/00 | (2006.01) |
|---|---|
| H01G 9/048 | (2006.01) |
| H01G 9/07 | (2006.01) |
| H01G 9/045 | (2006.01) |
| H01G 9/145 | (2006.01) |
| H01G 9/055 | (2006.01) |
| H01G 11/84 | (2013.01) |

(52) U.S. Cl.
CPC ......... *H01G 9/0029* (2013.01); *H01G 9/0032* (2013.01); *H01G 9/045* (2013.01); *H01G 9/048* (2013.01); *H01G 9/055* (2013.01); *H01G 9/07* (2013.01); *H01G 9/145* (2013.01); *H01G 11/84* (2013.01)

(58) Field of Classification Search
None
See application file for complete search history.

(56) References Cited

U.S. PATENT DOCUMENTS

| 2,461,410 | A |   | 2/1949 | Clark |   |
|---|---|---|---|---|---|
| 3,779,877 | A |   | 12/1973 | Alwitt |   |
| 4,525,249 | A |   | 6/1985 | Arora |   |
| 4,888,666 | A | * | 12/1989 | Naitoh | H01G 9/025 361/512 |
| 4,942,501 | A | * | 7/1990 | MacFarlane | H01G 9/022 29/25.03 |
| 5,142,451 | A |   | 8/1992 | Kurabayashi et al. |   |
| 5,146,391 | A | * | 9/1992 | MacFarlane | H01B 1/122 29/25.03 |
| 6,239,965 | B1 | * | 5/2001 | Shiraishi | H01G 9/025 361/522 |
| 6,510,044 | B1 |   | 1/2003 | Loffelholz et al. |   |
| 6,621,686 | B1 |   | 9/2003 | Jenn-Feng et al. |   |
| 6,802,954 | B1 |   | 10/2004 | Hemphill et al. |   |
| 6,858,126 | B1 |   | 2/2005 | Hemphill et al. |   |

(Continued)

FOREIGN PATENT DOCUMENTS

CN    103988271 A  *  8/2014 ............. H01G 11/04

*Primary Examiner* — Scott B Geyer (57) ABSTRACT

Fabricating a capacitor includes forming conduits in a porous layer of material. The porous layer of material has particles that each includes a dielectric on a core. The formation of the conduits causes a portion of the dielectric to convert from a first phase to a second phase. The method also includes removing at least a portion of the second phase of the dielectric from the porous layer of material.

20 Claims, 6 Drawing Sheets

(56) References Cited

U.S. PATENT DOCUMENTS

| | | |
|---|---|---|
| 8,535,527 B2 | 9/2013 | Irgum |
| 2003/0222048 A1* | 12/2003 | Asakawa .......... H01L 21/02211 |
| | | 216/2 |
| 2004/0134874 A1 | 7/2004 | Hossick-Schott et al. |
| 2006/0180474 A1* | 8/2006 | Fujimoto ............... H01G 9/045 |
| | | 205/213 |
| 2008/0266756 A1 | 10/2008 | Fujita et al. |
| 2009/0159322 A1* | 6/2009 | Wu ........................ H01G 9/012 |
| | | 29/25.42 |
| 2011/0149473 A1 | 6/2011 | Eilertsen et al. |
| 2011/0205691 A1 | 8/2011 | Fujita et al. |
| 2013/0155580 A1 | 6/2013 | Karnik et al. |
| 2013/0236782 A1 | 9/2013 | Ozaki et al. |
| 2015/0002986 A1 | 1/2015 | Gardner et al. |
| 2015/0003033 A1 | 1/2015 | Liu et al. |
| 2015/0129034 A1* | 5/2015 | Snaith ................. H10K 30/151 |
| | | 136/258 |
| 2016/0268059 A1 | 9/2016 | Ervin |
| 2017/0025658 A1* | 1/2017 | Shi .......................... C23C 14/20 |
| 2017/0076871 A1 | 3/2017 | Sherwood et al. |
| 2017/0076873 A1 | 3/2017 | Sherwood et al. |
| 2017/0221648 A1* | 8/2017 | Rolin ..................... H01G 11/84 |
| 2017/0237127 A1* | 8/2017 | Ishikawa ............... H01G 11/52 |
| | | 429/234 |
| 2017/0271086 A1* | 9/2017 | Kuzeci ................. H01G 9/0032 |
| 2018/0354069 A1* | 12/2018 | Erickson ............. B23K 26/082 |
| 2018/0358180 A1* | 12/2018 | Hemphill ............... H01G 9/055 |

\* cited by examiner

FORMATION OF CONDUITS IN POROUS CAPACITOR ELECTRODES

RELATED APPLICATIONS

This application is a divisional of U.S. patent application Ser. No. 15/728,313, filed on Oct. 9, 2017, and incorporated herein in its entirety.

FIELD

The invention relates to electrochemical devices. In particular, the invention relates to electrodes in capacitors.

BACKGROUND

Increasing the surface area of the anodes in many types of capacitors can lead to an increased capacitance. One approach to increasing the surface area is to form the anode from powder particles that are fused together such that pores are positioned between different fused particles. These pores provide the desired increase in the surface area of the anode; however, these capacitors have suffered from an inability to get both the capacitance and the delivered to stored energy ratio (electrical porosity) above desired target levels. For the above reasons, there is a need for improved capacitor anodes.

SUMMARY

A method of fabricating a capacitor includes forming conduits in a porous layer of material. The porous layer of material has particles that each includes a dielectric on a core. The formation of the conduits causes a portion of the dielectric to convert from a first phase to a second phase. The method also includes removing at least a portion of the second phase of the dielectric from the porous layer of material.

A capacitor has an anode with an active layer having both pores and conduits. The active layer includes particles that each has a dielectric on a core. The pores are located between the particles. A medium in the conduits is in direct physical contact with the dielectric on different particles.

Another version of a capacitor includes an anode with an active layer that has both pores and conduits. The conduits are arranged on the active layer in a periodic two-dimensional pattern.

Another version of a capacitor includes an anode with an active layer having both pores and conduits. The conduits extend from a surface of the active layer into the active layer. An average width of the conduits is more than 2 times an average width of the pores.

BRIEF DESCRIPTION OF THE FIGURES

FIG. 1A through FIG. 1D illustrate the construction of an anode for use in a capacitor.

FIG. 1D shows more details of the relationship between a conduit and the components of the active layer. The conduit extends part way into the active layer.

FIG. 5A through FIG. 5H illustrate a method of generating an anode for use in a capacitor constructed according to FIG. 1A through FIG. 3D.

DESCRIPTION

The capacitor has an anode with an active layer that includes fused particles. Voids between the fused particles provide pores through which an electrolyte can travel through the active layer. In some instances, these active layers are formed using techniques such as sintering of a powder. It has been found that the capacitance of such a capacitor increased by decreasing the average size of the powder particles that are subsequently fused together. However, decreasing the size of the powder particles results in narrower and more tortuous pore pathways. The small width of the pores combined with the tortuous nature of their path through the active layer generates resistance to the movement of electrolyte through the pores. This reduced movement of the electrolyte through the pores reduces the delivered to stored energy ratio (electrical porosity) of the capacitor.

The active material includes conduits that can extend from a surface of the active layer into the active layer. The average width of the conduits can be on the order of 2-20 times the average width of the pores. Additionally, the pores can be open to the interior of the conduits. Accordingly, the electrolyte can easily flow in and out of the conduits where it can enter and/or exit from the pores through the conduits. As a result, the conduits provide a larger pathway from the exterior surface of an active layer to pores that are deep within the active layer. The larger pathway reduces the resistance of the active layer to the movement of electrolyte through the active layer and accordingly increases the delivered to stored energy ratio (electrical porosity). As a result, the conduits make it possible for the active layer to have the higher capacity associated with narrow and tortuous pores and also to have an elevated electrical porosity.

Figures 1A, 1B:
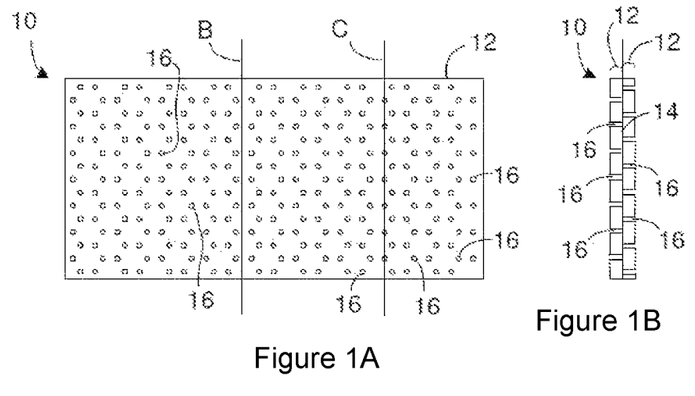
FIG. 1A is a sideview of an anode that is suitable for use in the capacitor. The anode includes conduits extending into an active layer.
FIG. 1B is a cross-section of the anode 10 shown in FIG. 1A taken along the line labeled B in FIG. 1A.
Figure 1C:
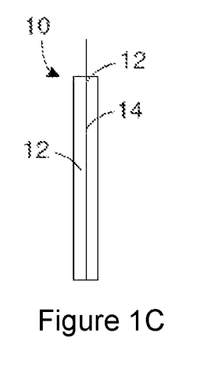
FIG. 1C is a cross-section of the anode 10 shown in FIG. 1A taken along the line labeled C in FIG. 1A.

FIG. 1A through FIG. 1D illustrate the construction of an anode for use in a capacitor. FIG. 1A is a sideview of an anode 10 that is suitable for use in the capacitor. FIG. 1B is a cross-section of the anode shown in FIG. 1A taken along the line labeled B in FIG. 1A. FIG. 1C is a cross-section of the anode shown in FIG. 1A taken along the line labeled C in FIG. 1A.

The anode 10 includes one or more active layers 12 on a current collector 14. The illustrated anode 10 includes the current collector 14 positioned between active layers 12. Suitable current collectors 14 include, but are not limited to, foils, meshes, and screens. FIG. 1A through FIG. 1C show a portion of the current collector 14 extending beyond the one or more active layers 12. The exposed portion of the current collector 14 is optional and can be used for making electrical connections to the anode 10. Conduits 16 extend into the active layers 12. The conduits 16 are shown with circular cross sections although other configurations are possible.

Figure 1D:
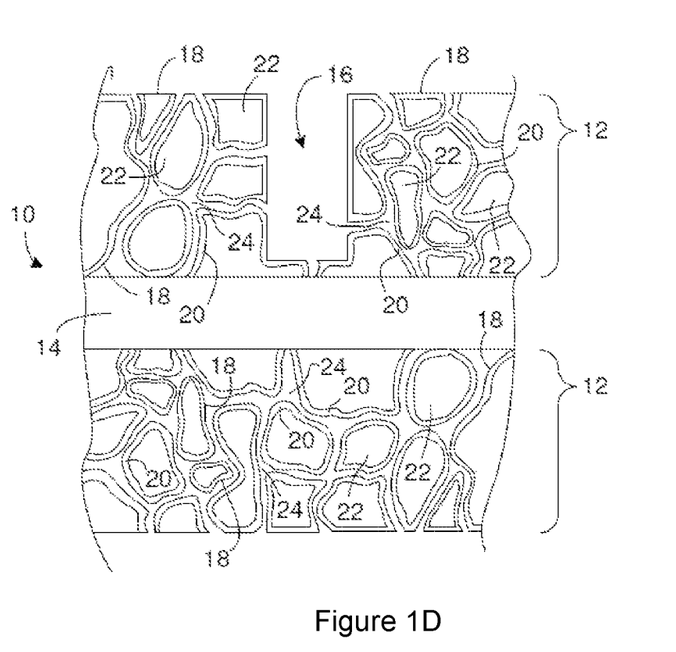
FIG. 1D is a cross section of a portion of the anode shown in FIG. 1A through FIG. 1C.

FIG. 1D is a cross section of a portion of the anode 10 shown in FIG. 1A through FIG. 1C. The cross section is taken through a conduit 16 and shows more details of the active layer 12 construction than is shown in FIG. 1A through FIG. 1C. The active layers 12 include particles that are fused together (fused particles 18). For instance, the active layers 12 can include sintered powder particles. As a result, a single fused particle 18 shown in FIG. 1D may represent a single particle of a powder or can represent two or more particles of powder that are fused together.

The fused particles 18 include, consist of, or consist essentially of a layer of a dielectric 20 on a core 22. The cores 22 can be electrically conducting and one or more of the cores 22 can be in direct physical contact with the current collector 14. Additionally, the fusion of the fused particles 18 provides an electrical pathway between different cores 22. As a result, the cores 22 are in electrical communication with the current collector 14.

In some instances, the dielectric 20 is an anode metal oxide and the core 22 is an electrical conductor such as an anode metal. The anode metal oxide can be an oxide of an anode metal included in the core 22. Suitable anode metals include, but are not limited to, aluminum, tantalum, magnesium, titanium, niobium, and zirconium. Many anode metal oxides can exist in more than one phase within the same material state (solid, liquid, gas, plasma). For instance, an anode metal oxide such as aluminum oxide can be in a solid first phase called the boehmite phase ($Al_2O_3$) or a second phase called alpha phase corundum oxide ($\alpha\text{-}Al_2O_3$) that is also a solid.

The active layer 12 includes pores 24 that result from the voids between adjacent fused particles 18 and that are present throughout the active layer 12. The pores 24 have non-uniform diameters and/or non-uniform cross sections and follow tortuous pathways through the active layer 12. A suitable porosity for portions of the active layer 12 that do not include any conduits 16 include, but are not limited to, porosity greater than 1%, 2% or 5% and/or less than 10%, 20% or 30%. An average width for the pores is greater than 0.1 µm, 1 µm, or 5 µm, and/or less than 100 µm, or 200 µm.

The conduits 16 extend from an exterior surface of an active layer 12 into the active layer 12 toward the current collector 14. The conduits 16 are fabricated after fusing the particles. The conduits 16 can be fabricated in a way that cuts through individual fused particles 18. As a result, the portion of the fused particles that define the conduits 16 can be smooth or substantially smooth. The dielectric 20 on the fused particles 18 defines the walls of the conduits 16. Accordingly, a medium located in the conduits 16 can be in direct physical contact with the dielectric 20. For instance, in a completed capacitor, an electrolyte in the conduits 16 can be in direct physical contact with the dielectric 20.

In some instances, the conduits 16 are fabricated to have a uniform or substantially uniform diameter and/or width along the depth of the conduit 16. In some instances, the length of the conduits 16 is perpendicular or substantially perpendicular to a surface of the current collector 14 and/or to a surface of the active layer 12. Additionally, the conduits 16 can be straight or substantially straight along their length. Accordingly, the conduits 16 can follow a less tortuous pathway through an active layer 12 than is followed by the pores 24.

Figure 2A:
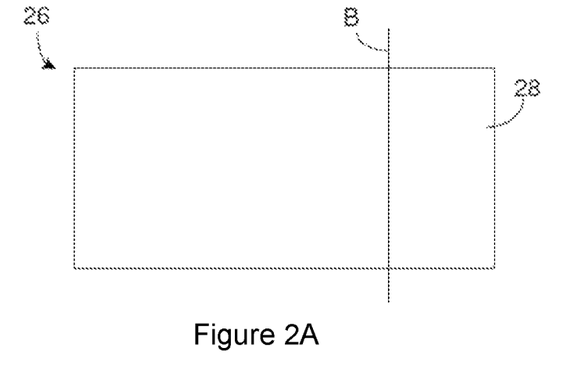
FIG. 2A is a sideview of a cathode that is suitable for use in the capacitor.
Figure 2B:
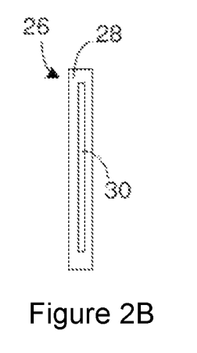
FIG. 2B is a cross-section of the cathode shown in FIG. 2A taken along the line labeled B in FIG. 2A.

FIG. 2A is a sideview of a cathode 26 that is suitable for use in the capacitor. FIG. 2B is a cross-section of the cathode 26 shown in FIG. 2A taken along the line labeled B in FIG. 2A. The cathode 26 includes a layer of cathode metal oxide 28 over a layer of a cathode metal 30. Suitable cathode metals 30 include, but are not limited to, aluminum, titanium, and stainless steel. Although not illustrated, the cathode metal 30 can be layer of material on a substrate. For instance, the cathode metal 30 can be a titanium or titanium nitride coating on a substrate such as a metal and/or electrically conducting substrate. Examples of suitable substrates include, but are not limited to, aluminum, titanium, and stainless steel substrates. The cathode metal oxide 28 can be formed on the cathode metal 30 by oxidizing the cathode metal 30 in air. The cathode metal 30 can be the same as the anode metal or different from the anode metal. In some instances, the cathode metal 30 and the anode metal are both aluminum. As illustrated in FIG. 2B, in some instances, the cathode metal oxide 28 surrounds the cathode metal 30. For instance, the cathode metal oxide 28 is positioned over the edges and faces of the cathode metal 30.

Figure 3A:
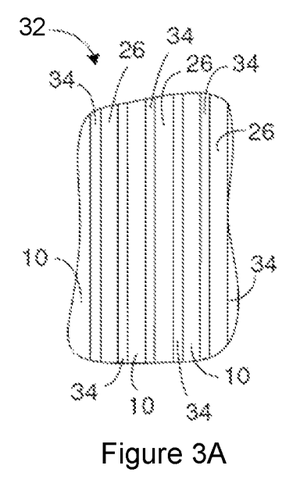
FIG. 3A is a cross section of an electrode assembly where anodes are alternated with cathodes.

The anodes 10 and cathodes 26 are generally arranged in an electrode assembly 32 where one or more anodes 10 are alternated with one or more cathodes 26. For instance, FIG. 3A is a cross section of an electrode assembly 32 where anodes 10 are alternated with cathodes 26. The anodes 10 and cathodes 26 can be constructed according to FIG. 1A through FIG. 2B. A separator 34 is positioned between anodes 10 and cathodes 26 that are adjacent to one another in the electrode assembly 32. The electrode assembly 32 typically includes the anodes 10 and cathodes 26 arranged in a stack or in a jelly roll configuration. Accordingly, the cross section of FIG. 3A can be a cross section of an electrode assembly 32 having multiple anodes 10 and multiple cathodes 26 arranged in a stack. Alternately, the cross section of FIG. 3A can be created by winding one or more anodes 10 together with one or more cathodes 26 in a jelly roll configuration. However, as the anodes 10 become more brittle due to increased surface area, it may not be practical or possible to form a jellyroll configuration. Suitable separators 34 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

Figure 3B:
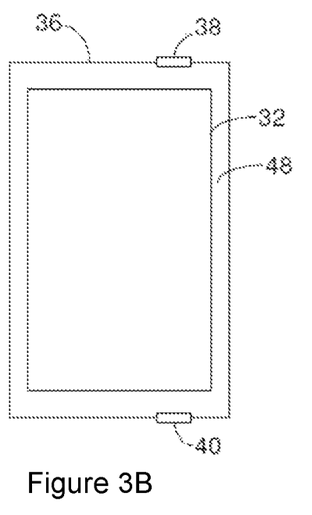
FIG. 3B is a schematic diagram of a capacitor that includes the electrode assembly of FIG. 3A positioned in a capacitor case.

The electrode assembly 32 is included in a capacitor. For instance, FIG. 3B is a schematic diagram of a capacitor that includes the electrode assembly 32 of FIG. 3A positioned in a capacitor case 36. Although not illustrated, the one or more anodes 10 in the electrode assembly 32 are in electrical communication with a first terminal 38 that can be accessed from outside of the capacitor case 36. The one or more cathodes 26 in the electrical assembly are in electrical communication with a second terminal 40 that can be accessed from outside of the capacitor case 36. In some instances, the one or more anodes 10 include or are connected to tabs (not shown) that provide electrical communication between the one or more anodes 10 and the first terminal 38 and the one or more cathodes 26 include or are connected to tabs (not shown) that provide electrical communication between the one or more cathodes 26 and the second terminal 40. The capacitor can include one or more electrical insulators (not shown) positioned as needed to prevent shorts-circuits within the capacitor.

Figure 3C:
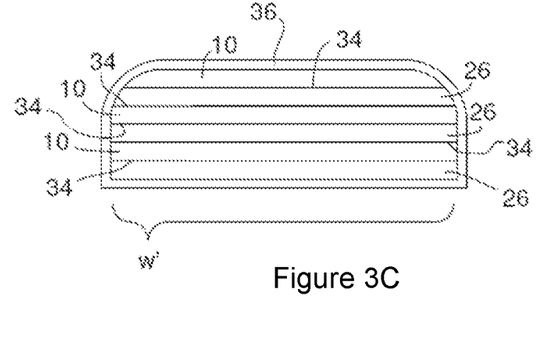
FIG. 3C is a cross section of a capacitor illustrating the positioning of the electrode assembly relative to the capacitor case.

FIG. 3C is a cross section of a capacitor illustrating the positioning of the electrode assembly 32 relative to the capacitor case 36. The first terminal 38 and the second terminal 40 are not shown in FIG. 3C. The illustrated electrode assembly 32 includes anodes 10 and cathodes 26 stacked such that anodes 10 are alternated with cathodes 26 and separators 34 are positioned between adjacent anodes 10 and cathodes 26. The upper side of the capacitor case 36 is curved. In order to make best use of the space that is available in the case, the electrode assembly 32 is configured to conform to the interior of the capacitor case 36. As a result, a portion of the anodes 10 and/or cathodes 26 have tapered edges that allow these electrodes to be positioned adjacent to the curved portion of the capacitor case 36. As is evident in FIG. 3C, the ability to shape the electrode edges increases the packing efficiency of the electrodes within the capacitor case. Further, the conduits may make it possible to use a thicker anode. The use of thicker anodes can also improve packing efficiency because fewer anodes would be needed in the capacitor case. When the disclosed anodes are included in an Implantable Cardioverter Defibrillator (ICD), a suitable thickness for the anodes may include a thickness greater than 100 µm or 400 µm and/or less than 500 µm or 1000 µm. Additionally or alternately, different electrodes within the electrode assembly 32 can have different sizes. For instance, the electrodes closer to the top of the capacitor case 36 shown in FIG. 3C can have a smaller width (labeled w in FIG. 3C) or diameter.

Figure 3D:
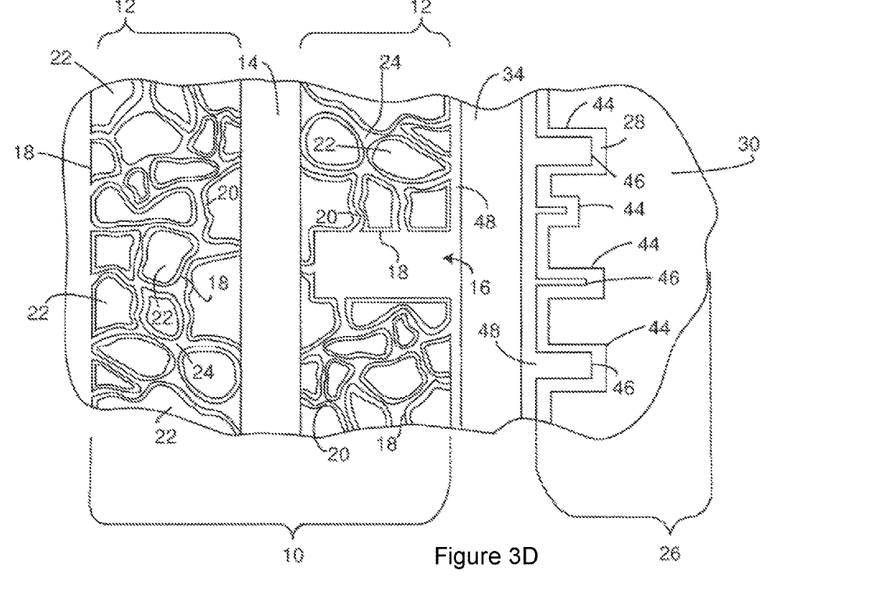
FIG. 3D is a sideview of an interface between an anode and a cathode that are adjacent to one another in the capacitor of FIG. 3B.

FIG. 3D is a sideview of an interface between an anode 10 and a cathode 26 that are adjacent to one another in the capacitor of FIG. 3B. The illustration in FIG. 3D is magnified so it shows features of the anode 10 and cathode 26 that are not shown in FIG. 2A and FIG. 2B. For instance, the surface of the cathode 26 optionally includes cathode channels 44 that extend into the cathode metal 30 so as to increase the surface area of the cathode metal 30. Suitable cathode channels 44 include, but are not limited to, pores, trenches, tunnels, recesses, and openings. The cathode metal oxide 28 can be positioned on the surface of the cathode metal 30. When the cathode metal 30 includes cathode channels 44, the cathode metal oxide 28 can be positioned in the cathode channels 44. The cathode metal oxide 28 can fill the cathode channels 44 and/or cathode oxide channels 46 can extend into the cathode metal oxide 28.

An electrolyte 48 is in contact with the separator 34, the anode 10 and the cathode 26. The electrolyte 48 can be positioned in the pores 24 of the active layers 12. The components of the anode 10 can be positioned on the cores 22 such that the cores 22 do not directly contact the electrolyte 48. For instance, the dielectric 20 and the current collector 14 can prevent direct contact between the cores 22 and the electrolyte 48. In some instances, the dielectric 20, an oxide, and the current collector 14 can prevent direct contact between the cores 22 and the electrolyte 48. For instance, the oxide can form on the surface of the core when the electrolyte and core come into contact while an electrical potential is applied to the cores.

When the cathode metal 30 includes cathode oxide channels 46, the electrolyte 48 can be positioned in the cathode oxide channels 46. The electrolyte 48 can be a liquid, solid, gel or other medium and can be absorbed in the separator 34. The electrolyte 48 can include one or more salts dissolved in one or more solvents. For instance, the electrolyte 48 can be a mixture of a weak acid and a salt of a weak acid, preferably a salt of the weak acid employed, in a polyhydroxy alcohol solvent. The electrolytic or ion-producing component of the electrolyte 48 is the salt that is dissolved in the solvent.

A capacitor constructed according to FIG. 3A through FIG. 3D can be an electrolytic capacitor such as an aluminum electrolytic capacitor, a tantalum electrolytic capacitor or a niobium electrolytic capacitor. An electrolytic capacitor is generally a polarized capacitor where the anode metal oxide serves as the capacitor dielectric and the electrolyte 48 effectively operates as the cathode.

It has been found that the capacitance of a capacitor constructed according to FIG. 3A through FIG. 3D can be increased by decreasing the average size of particles that are subsequently fused together. For instance, when the fused particles 18 are generated by fusing powder particles, the capacitance of the capacitor constructed can be increased by decreasing the average size of powder particles. However, the decreasing size of the particles that are subsequently fused together is also associated with narrower and more tortuous pore pathways. The small width of the pores 24 combined with the tortuous nature of their path through the active layer 12 generates resistance to the movement of electrolyte 48 through of the pores 24. Reduced movement of electrolyte 48 through the pores 24 reduces the delivered to stored energy ratio (electrical porosity). The conduits 16 help to overcome this issue. For instance, the average width of the conduits 16 can be on the order to 2-20 times the average width of the pores 24. Additionally, as is evident from FIG. 1D, the pores 24 are open to the interior of the conduits 16 along the depth of the conduit 16. Accordingly, the electrolyte 48 can easily flow through of the conduits 16 where it can enter and/or exit from the pores 24 through the conduits 16. As a result, the conduits 16 provide a larger pathway from the exterior surface of an active layer 12 to pores 24 that are deep within the active layer 12. The larger pathway reduces the resistance of the active layer 12 to the movement of electrolyte 48 in an out of the active layer 12 and accordingly increases the delivered to stored energy ratio (electrical porosity). The conduits 16 permit the capacitor to have delivered to stored energy ratio (electrical porosity) greater than 0.85:1 or 0.90:1 and/or less than 0.90:1 or 0.95:1. In application such as Implantable Cardioverter Defibrillator (ICD), it is desirable for the delivered to stored energy ratio (electrical porosity) to be at or above 0.90 for packaging efficiency and to improve the battery life per battery volume due to a reduction in the amount of stored energy needed for the battery to charge the capacitor to deliver the same output energy.

One or more variable selected from the group consisting of the width, average width, diameter and average diameter of a conduit 16 can be more than 0.1 µm, 1 µm, or 50 µm and/or less than 200 µm, 500 µm, or 1000 µm. Additionally or alternately, one or more variable selected from the group consisting of the width, average width, diameter and average diameter of the conduits 16 can be more than 1, 2, 5, or 10 times the average width of the pores 24 and/or less than 20, 50, 100, or 200 times the average width of the pores 24 times the average width of the pores 24. The aspect ratio or average aspect ratio of the conduits 16 can be greater than 5:1, 6:1, or 8:1 and/or less than 11:1, or 20:1. As will be described in more detail below, the conduits 16 can be formed by laser drilling. The upper limit for the aspect ratio of laser drilled conduits 16 is generally less than 11:1. Accordingly, aspect ratios less than 11:1 may currently be the practical upper limit for conduits 16 although later developments may make higher aspect ratios practical. Lower aspect ratios can also be used but are generally associated with a reduction in surface area of the active layer 12.

Increasing the average density of the porosity openings across the surface of the active layer 12 can increase the uniformity of electrolyte flow in and out of the active layer 12 across the active layer 12. However, increasing the number of conduits 16 can also reduce the surface area of the active layer 12 and accordingly reduce the capacitance. A suitable average density of the conduits across the surface of the active layer 12 includes, but is not limited to, an average density greater (ratio of active layer surface area that is not occupied by an opening to a conduit:active layer surface area that is occupied by the opening to a conduit) than 1:1, 20:1, or 50:1 and/or less than 200:1, 500:1, or 1000:1. The conduit density that is desired can be a function of the conduit depth. For instance, deeper conduits can permit the conduit density to be reduced.

The conduits 16 can be arranged in a two-dimensional periodic pattern. For instance, FIG. 1A shows the conduits 16 arranged in hexagonal pattern. Arranging the conduits 16 in a two-dimensional pattern can increase the uniformity of electrolyte flow in and out of the pores 24 across the active layer 12. Other examples of suitable patterns for the conduits 16 include, but are not limited to, square and triangular. Other arrangements for the conduits 16, including random arrangements, can be used; however, random or pseudorandom patterns may result in an uneven flow of electrolyte in and out of the pores 24 across the active layer 12.

Figure 4A:
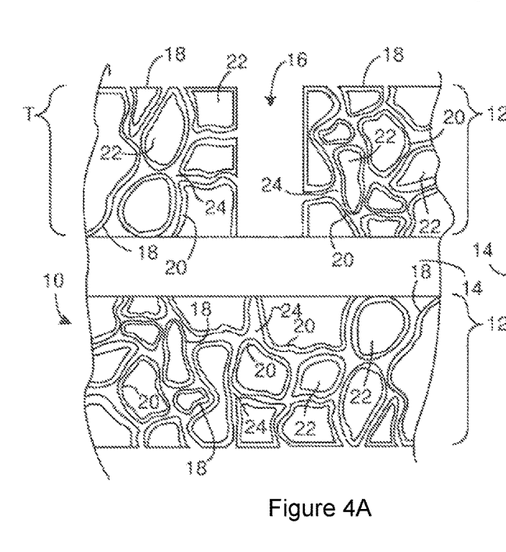
FIG. 4A is a cross section of a portion of the anode shown in FIG. 1A through FIG. 1C. A conduit extends through an active layer to an underlying current collector.
Figure 4B:
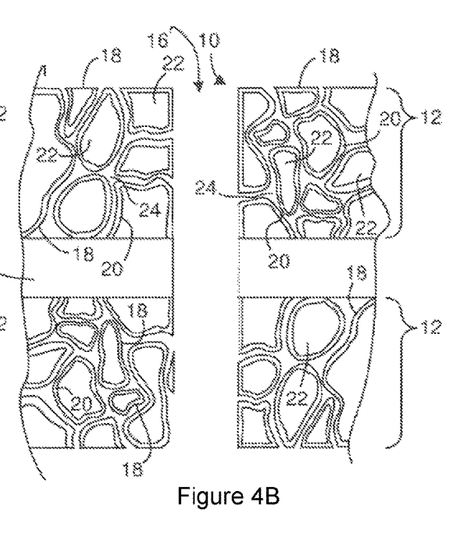
FIG. 4B is a cross section of a portion of the anode shown in FIG. 1A through FIG. 1C. A conduit extends through the entire anode.

Although FIG. 1D shows a conduit 16 extending part way through the thickness of the active layer 12, the conduits 16 can extend through an active layer 12 to the underlying current collector 14 as shown in FIG. 4A. Alternately, the conduits 16 can extend through the anode and/or through both active layers 12 and the current collector as shown in FIG. 4B. The active layers 12 have a thickness that is labeled T in FIG. 4A and is measured in a direction perpendicular to a surface of the current collector 14. When the conduit 16 extends part way through the thickness of the active layer 12, a suitable depth for the conduits 16 includes, but is not limited to, depths that are greater than 50% and/or less than 100% of the thickness of the active layer 12.

Figure 5A:
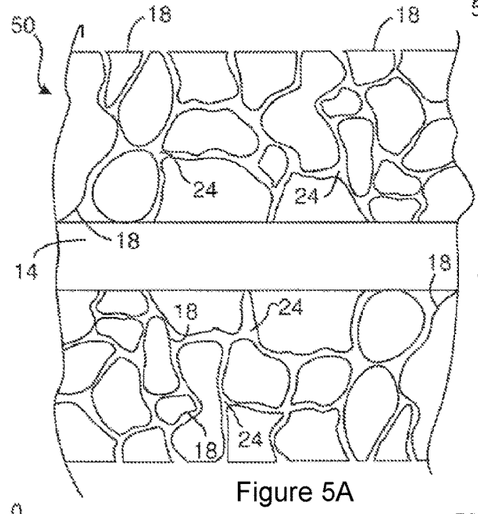
FIG. 5A is a cross section of a sheet of material that has fused particles on a current collector. An anode precursor will be extracted from the sheet of material at a later stage of the method.

FIG. 5A through FIG. 5H illustrate a method of generating an anode 10 for use in a capacitor constructed according to FIG. 1A through FIG. 3D. FIG. 5A is a cross section of a sheet of material 50 that has fused particles 18 on a current collector 14. An anode precursor will be extracted from the sheet of material 50 at a later stage of the method. Suitable methods of generating the sheet of material 50 include, but are not limited to, sintering of powder on the current collector 14. Sintering includes pressing and/or compacting the powder without melting the powder to the point of liquefaction. Heat may or may not be applied during the sintering process.

In some instances, the powder used in generating the sheet of material 50 can have a constant diameter or width. However, in other instances, the powder used in generating the sheet of material 50 can have a variety of different diameters or widths. Since smaller particles can fit into the pores 24 between larger particles, a variety of different powder sizes can increase the surface area of the active layer 12. Suitable diameters or widths or average diameters or average widths for the powder can be greater than 2 µm, 4 µm, or 5 µm, and/or less than 6 µm, 7 µm, or 10 µm. Suitable powders include, but are not limited to, aluminum, tantalum, magnesium, titanium, niobium, and zirconium.

Figure 5B:
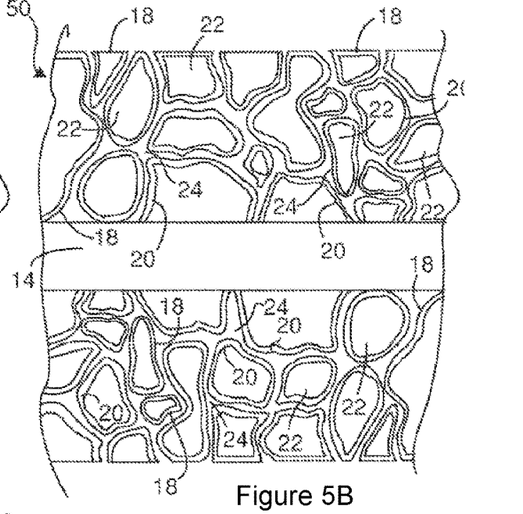
FIG. 5B is a cross section of the sheet of material of FIG. 5A after dielectrics are formed on the fused particles so as to provide fused particles that each have the dielectric on a core.

The dielectrics 20 can be formed on the fused particles 18 in the sheet of material 50 of FIG. 5A so as to provide the sheet of material 50 of FIG. 5B. FIG. 5B is a cross section of the sheet of material 50. When the fused particles 18 are an anode metal, the dielectrics 20 can be an oxide of the anode metal. An example of a suitable method of forming the anode metal oxide dielectric 20 on the fused particles 18 includes mechanisms that convert existing anode metal to anode metal oxide. In these mechanisms, a portion of the fused particles 18 is converted to an oxide that serves as the dielectric 20 while another portion of the fused particles 18 is not converted and serves as the core 22. A suitable method for converting an existing anode metal to an anode metal oxide includes, but is not limited to, anodic oxidation. In anodic oxidation, the sheet of material 50 is placed in an electrolytic bath while a positive voltage is applied to the sheet of material 50. The thickness of the layer of anode metal oxide can be increased by increasing the applied voltage. When the anode metal is aluminum, anodic oxidation forms a layer of the first phase (boehmite phase) of aluminum oxide ($Al_2O_3$) on a layer of aluminum. In one example of anodic oxidation, the anode metal oxide is formed by placing the sheet of material 50 in citric acid while a positive voltage of 400-550 volts is applied to the sheet of material 50 for a period of time. Additionally or alternately, the electrical current that results from the applied voltage can be monitored and the sheet of material 50 can be removed from the electrolytic solution in response to the electrical current falling below a threshold exit leakage current.

Figure 5C:
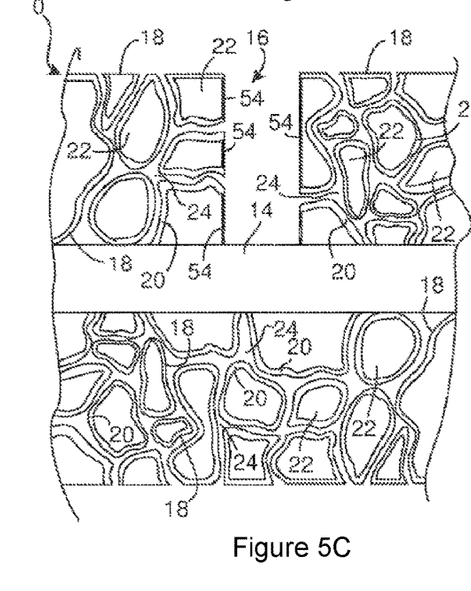
FIG. 5C is a cross section of the sheet of material of FIG. 5B after a conduit is formed in the sheet of material. The formation of the conduit can convert a first phase of the dielectric to a second phase of the dielectric that is located in the conduit.

The conduits 16 are formed in the fused particles 18 in the sheet of material 50 of FIG. 5B so as to provide the active layers 12 shown in the sheet of material 50 of FIG. 5C. Suitable methods of forming the conduits 16 include, but are not limited to, laser drilling. However, laser drilling the conduits 16 can cause melted portions of the sheet of material 50 to solidify in a conduit and close the conduit 16. Additionally or alternatively, portions of the sheet can redeposit in the conduits 16 and/or on a surface of the active layer during the laser drilling process. The presence of these materials in the conduits 16 and/or on the surfaces of the active layer can be reduced by using a pulsed laser beam. The short pulse durations that are possible with pulsed lasers can provide very high peak powers for moderately energetic pulses. The increased peak power can provide vaporization of the fused particles 18 and/or current collector 14 during the laser drilling process. This vaporization can eject the material from the conduits 16 through the top of the conduit 16. Since the material is ejected from the sheet of material 50, the material is not available to re-solidify or re-deposit the conduit 16.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz.

The power density of the laser beam at the sheet of material 50 can be at a level that a single pulse elevates the temperature of the sheet of material 50 above the boiling point of the anode metal and vaporizes the anode metal. In some instances, power density of the laser beam is such that at least a portion of the sheet of material 50 that is illuminated by the laser reaches the boiling point of the dielectric 20, core 22, and/or current collector 14 and vaporizes a portion of dielectric 20, core 22, and/or current collector 14 in a period of time less than or equal to the duration of one pulse when the illuminated portion of the sheet of material 50 is at temperature (23° C. or 25° C.) before the pulse. In an example where the anode metal is aluminum, the pulse duration is 820 femtoseconds, the pulse frequency is 400,000 pulses per second, and the laser beam has a power density $7.99 \times 10^{11}$ W/cm$^2$ at the surface of the sheet of material 50. Suitable power densities include, but are not limited to, power densities greater than 0 W/cm$^2$, $1 \times 10^{11}$ W/cm$^2$, or $2 \times 10^5$ W/cm$^2$ and/or less than $9 \times 10^{11}$ W/cm$^2$, or $2 \times 10^5$ W/cm$^{12}$. The combination of elevated power densities and reduced pulse durations reduces the amount of heat transferred to the sheet of material 50.

The path of the laser beam across the face of the sheet of material 50 can be controlled by electronics and/or software. The electronics and/or software can move the laser beam relative to the sheet of material 50 and/or the sheet of material 50 relative to the laser beam. Accordingly, the conduits 16 can be drilled sequentially in the sheet of material 50. In some instances, all or a portion of the conduits 16 can be partially drilled and the laser can later return to the partially drilled conduits 16 to further drill the partially drilled conduits 16. In these instances, the laser can return to the partially drilled conduits 16 one or more times until the conduits 16 have reached the desired depth.

When the dielectric 20 is an oxide, the high heat transfer that occurs during the laser drilling process can convert the dielectric 20 to a less desirable second phase 54 that is present on the surface(s) in the interior conduits 16. For instance, when the dielectric 20 is aluminum oxide, the laser drilling can convert the aluminum oxide from the desirable first phase called boehmite ($Al_2O_3$) to the undesirable second phase 54 called alpha phase corundum oxide phase ($\alpha$-$Al_2O_3$). The corundum oxide is undesirable and can increase leakage current and deformation. Further, the corundum oxide is stable and very difficult to convert back to a suitable aluminum oxide phase.

Figure 5D:
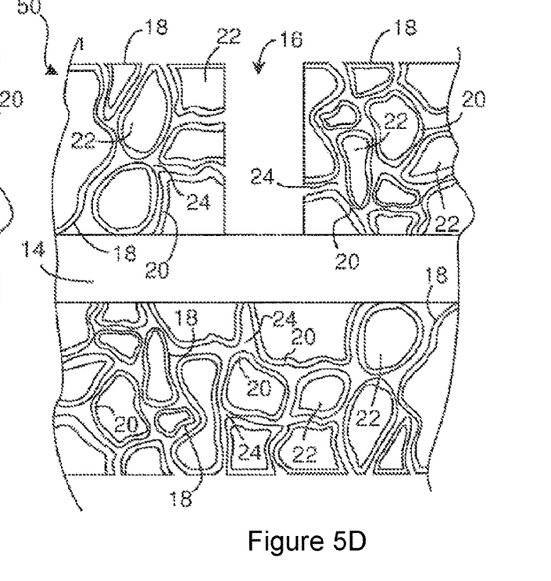
FIG. 5D is a cross section of the sheet of material of FIG. 5C after at least a portion of the second phase of the dielectric is removed from the sheet of material.

The less desirable second phase 54 of the dielectric 20 is removed from the sides of the conduits 16 in the sheet of material 50 of FIG. 5C so as to provide the sheet of material 50 of FIG. 5D. Suitable methods for removing the second phase 54 of oxide include, but are not limited to, widening processes such as etching. Suitable etches include, but are not limited to, chemical and electrochemical processes such as wet etches. During these processes, the etch can be selected such that the dielectrics 20 on the fused particles 18 acts as a mask that protects the underlying cores 22 from the etchant. In one example of a widening process, widening of the conduits 16 includes immersing at least a portion of the sheet of material 50 in an electrolyte solution that includes, consists of, or consists essentially of a chloride or nitrate such as aluminum nitrate. Additional examples of suitable methods for widening of the preliminary channels 52 and/or additional details about the above methods of widening preliminary channels 52 can be found in U.S. patent application Ser. No. 05/227,951, filed on Feb. 22, 1972, granted U.S. Pat. No. 3,779,877, and entitled "Electrolytic Etching of Aluminum Foil;" U.S. patent application Ser. No. 06/631,667, filed on Jul. 16, 1984, granted U.S. Pat. No. 4,525,249, and entitled "Two Step Electro Chemical and Chemical Etch Process for High Volt Aluminum Anode Foil;" U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

Removing the second phase 54 of the dielectric is optional. Removing the second phase 54 of the dielectric can be done during subsequent processes. An example of a suitable process for removing the second phase 54 of the dielectric is the oxide phase extraction described in more detail below.

The process of removing the second phase 54 of the dielectric can leave cores 22 within the conduits 16 exposed to the interior of the conduits 16 as shown in FIG. 5D. Accordingly, additional dielectric 20 can be formed in the interior of conduits 16 so as to provide the sheet of material 50 of FIG. 5E. For instance, additional dielectric can be formed on the interior walls of the conduits 16 in FIG. 5D. As an example, when the cores 22 are an anode metal and the dielectric 20 is an anode metal oxide, at least the portion of the cores 22 that are exposed to the contents of the conduits 16 can be converted from the core material to the oxide of the core material. A suitable method for converting an existing anode metal to an anode metal oxide includes, but is not limited to, anodic oxidation. In anodic oxidation, the sheet of material 50 is placed in an electrolytic bath while a positive voltage is applied to the sheet of material 50. The thickness of the layer of anode metal oxide can be increased by increasing the applied voltage. The dielectric 20 formed in the interiors of the conduits 16 can be the first phase of the dielectric. For instance, when the anode metal is aluminum, anodic oxidation forms a layer of the first phase of aluminum oxide (boehmite, $Al_2O_3$) on a layer of aluminum. In one example of anodic oxidation, the anode metal oxide is formed by placing the sheet of material 50 in citric acid while a positive voltage of 400-550 volts is applied to the sheet of material 50 for a period of time. Additionally or alternately, the electrical current that results from the applied voltage can be monitored and the sheet of material 50 can be removed from the electrolytic solution in response to the electrical current falling below a threshold exit leakage current.

Figure 5E:
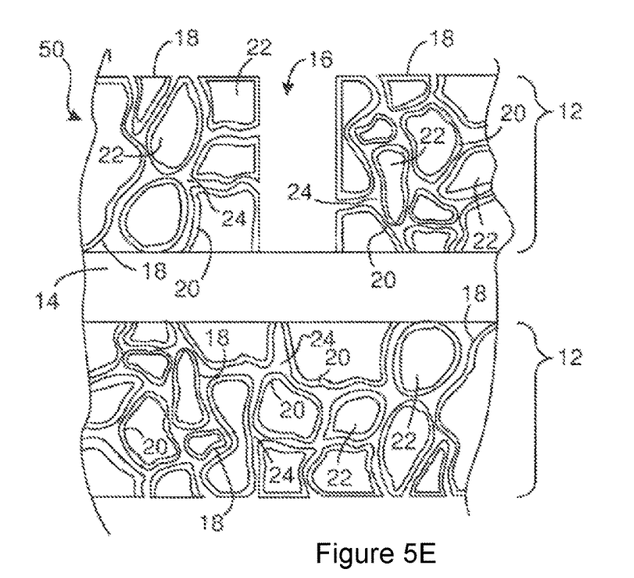
FIG. 5E is a cross section of the sheet of material of FIG. 5D after the dielectric is formed on exposed cores of the fused particles.

Forming additional dielectric 20 in the interior of conduits 16 is optional. The additional dielectric 20 can be formed on the interior walls during subsequent processes. An example of a suitable subsequent process for forming additional dielectric 20 on the interior walls of the conduits 16 includes, but is not limited to, an aging process that is described in more detail below.

One or more anode precursors can be extracted from the sheet of material 50 of FIG. 5C, or FIG. 5D or FIG. 5E. Accordingly, a portion of the sheet of material 50 becomes the anode(s). Suitable methods of removing an anode precursor from the sheet of material 50 include, but are not limited to cutting the anode precursor(s) out of the sheet of material 50. A suitable method of cutting the anode precursor(s) out of the sheet of material 50 include mechanical cutting method such as die cutting where the anode precursor is punched or stamped from a sheet of material 50 using a mechanical die. Another suitable method of cutting the anode precursor(s) out of the sheet of material 50 includes no-contact cutting methods such as laser cutting of the anode precursor.

Figure 5F:
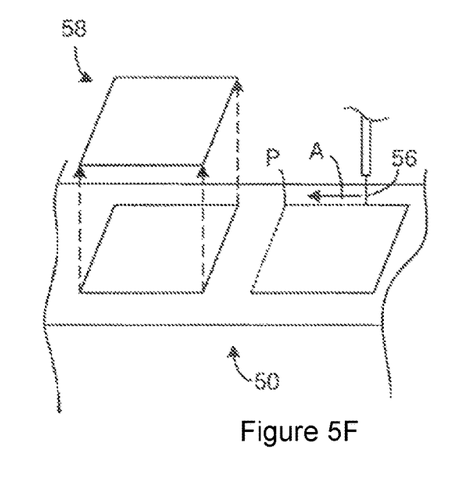
FIG. 5F illustrates extraction of anode precursor from the sheet of material of FIG. 5C, FIG. 5D, or FIG. 5E.

Laser cutting may provide an increase in yield and efficiency when compared with mechanical cutting methods. Laser cutting of the sheet of material 50 can cause melted portions of the sheet of material 50 to solidify and stay on the resulting anode precursor. Alternately, portions of the sheet can redeposit on the resulting anode precursor during the laser cutting process. These excess materials can be reduced by using a pulsed laser beam. The short pulse durations are possible with pulsed lasers can provide very high peak powers for moderately energetic pulses. The increased peak power can provide vaporization of the sheet of material 50 during the laser cutting process. This vaporization can eject the material from any recess or trench created in the sheet of material 50 through the top of the sheet of material 50. Since the material is ejected from the sheet of material 50, the material is not available to re-solidify or re-deposit on the sheet of material 50.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz. The pulse duration and/or frequency can be the same or different as the pulse duration and/or frequency used during laser drilling.

The power density of the laser beam at the sheet of material 50 can be at a level that a single pulse elevates the temperature of the sheet of material 50 above the boiling point of the anode metal and vaporizes the anode metal. In some instances, power density of the laser beam is such that at least a portion of the sheet of material 50 that is illuminated by the laser reaches the boiling point of the anode metal and vaporizes in a period of time less than or equal to the duration of one pulse when the illuminated portion of the sheet of material 50 is at temperature (23° C. or 25° C.) before the pulse. In an example where the cores 22 include or consist of aluminum as an anode metal, the pulse duration is 820 femtoseconds, the pulse frequency is 400,000 pulses per second, and the laser beam has a power density $7.99 \times 10^{11}$ W/cm$^2$ at the surface of the sheet of material 50. Suitable power densities include, but are not limited to, power densities greater than 0 W/cm$^2$, $1 \times 10^{11}$ W/cm$^2$, or $2 \times 10^5$ W/cm$^2$ and/or less than $9 \times 10^{11}$ W/cm$^2$, or $2 \times 10^5$ W/cm$^{12}$. In some instances, one, two, or three of the parameters selected from the group consisting of pulse duration, frequency, and power density are the same during laser cutting as during laser drilling. The combination of elevated power densities and reduced pulse durations reduces the amount of heat transferred to the sheet of material 50. However, adjusting these parameters may not be sufficient to address an increase in deformation that can result from using laser cutting of the anodes rather than stamped or punched cutting of the anodes.

The path of the laser beam across the face of the sheet of material 50 during cutting can be controlled by electronics and/or software. The electronics and/or software can move the laser beam relative to the sheet of material 50 and/or the sheet of material 50 relative to the laser beam. FIG. 5F illustrates use of a laser 56 to cut anode precursors 58 out of a sheet of material 50 constructed according to FIG. 5C, FIG. 5D, or FIG. 5E. In some instances, the same laser used to drill the conduits 16 is used to remove the anode precursors 58 from the sheet of material 50. In FIG. 5F, the solid lines and the dashed lines that show the outline of an anode precursor 58 in the sheet of material 50 represent the laser beam pathway during the process of cutting the anode precursor 58 from the sheet of material 50.

The inventors have found that tuning the characteristics for the laser beam path across the sheet of material 50 can also reduce the leakage and deformation to or even below the levels associated with stamping or punching of anodes. For instance, the rate at which the beam is scanned across the sheet of material 50 can be tuned. Faster scan rates reduce the amount of energy that is absorbed by the anode precursor. In some instances, the laser beam is scanned across the sheet of material 50 at a rate greater than 0 mm/sec, 100 mm/sec, or 600 mm/sec, and/or less than 900 mm/sec, or 1100 mm/sec.

Reducing the spot size can also reduce the amount of thermal energy transferred to the sheet of material 50. Suitable spot sizes include, but are not limited to, spot having a diameter or major axis greater than 10 microns, 30 microns and/or less than 50 microns, or 150 microns. Additionally or alternately, the spot size can be selected to produce spot overlaps less than 100%. A spot is the area of the sheet of material 50 illuminated by the laser beam during a pulse. Spot overlap is the overlap of a spot with the spot provided by the previous pulse. Suitable spot overlaps include spot overlaps greater than 70%, or 90% and/or less than 100%. The spot size can be selected to provide these levels of spot overlap when combined with the above scan rates and pulse frequencies.

Increasing the beam scan rate can reduce the depth that the laser beam cuts into the sheet of material 50. As a result, multiple passes of the laser beam along a pathway may be necessary in order to completely cut the anode precursor out of the sheet of material 50. This result is evident in the pathway labeled P FIG. 2G. The pathway includes dashed lines that indicate where the laser beam has cut into the sheet of material 50 without cutting through the sheet of material 50. The pathway also includes solid lines that indicate the portion of the anode precursor outline where the laser beam has cut through the sheet of material 50. Additionally, the arrow labeled A indicates the travel direction travel for the laser beam relative to the anode precursor. At the start of the laser cutting, the laser beam may be incident on the anode metal oxide. Once the laser beam has cut through the anode metal oxide, the laser beam is incident on the anode metal.

The need for multiple passes of the laser beam in order to cut through the sheet of material 50 means that each location along the beam pathway is not exposed to the laser beam energy for a pass interval. The pass interval can be the time between passes of the laser beam and/or can be the period of time that passes between each point along the pathway being exposed to the laser beam. Suitable pass intervals include, but are not limited to, pass intervals more than 0.1 seconds per pass and/or less than 3 seconds per pass. In some instances, the pass interval is selected such that more than 5, or 10 and/or less than 100 passes of the laser beam around the entire outline of the anode precursor are required to completely extract an anode precursor from the sheet of material 50.

Figure 5G:
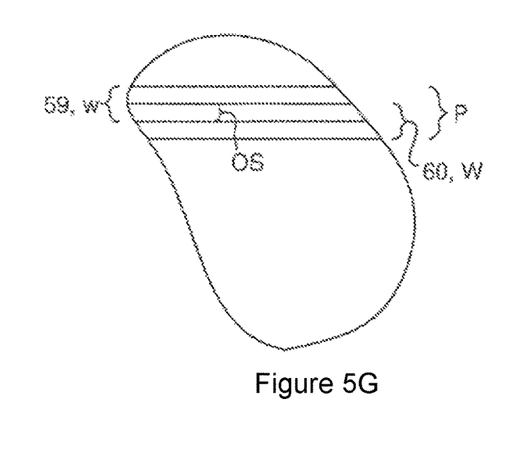
FIG. 5G is a topview of a portion of a sheet of material having a laser pathway with multiple different tracks.

The laser pathway can includes multiple different tracks. FIG. 5G is a topview of a portion of a sheet of material 50. A portion of a laser pathway on the sheet of material 50 is labeled P. The laser pathway includes a first track 59 represented by dashed lines and a second track 60 represented by solid lines. The first track 59 represents the track that the laser follows during a pass along the laser pathway. The second track 60 represents the track that the laser follows during a different pass along the laser pathway. The first track 59 has a width labeled w and the second track 60 has a width labeled W. When the first track 59 and the second track 60 are followed by the same laser or by lasers with the same spot size, the width of the first track 59 will be the same or about the same as the width of the second track 60.

The second track 60 is offset from the first track 59 by a distance labeled OS in FIG. 5G. The amount of offset can be selected such that the second track 60 partially overlaps the first track 59 as shown in FIG. 5G. The use of partially overlapping tracks while laser cutting the anode precursor widens the trench that the laser forms in the sheet of material 50 to a width larger than the spot diameter. The cutting of a wider trench can reduce the amount of thermal energy that is applied to previously formed surfaces in the trench. The track overlap percentage can be the overlap distance divided by the width of the overlapped track. Suitable track overlap percentages include, but are not limited to, track overlap percentages greater than 25% or 30% and/or less than 50% or 75%. The offset distance can be a function of spot size. For instance, when the spot size has a diameter of 40 microns, a suitable offset distances can be any distance between 0 and 40 microns such as 10 to 30 microns.

In some instances, the different tracks extend around the perimeter of the anode and/or surround the perimeter of the anode. For instance, the entire length of the laser pathway shown FIG. 5F can include two tracks that partially overlap as shown in FIG. 5G. In other words, the laser pathway of FIG. 5G can represent the laser pathway of any straight portion of the laser pathway shown FIG. 5F. Accordingly, the laser can trace all, or substantially all, of the anode perimeter along one track and later trace all, or substantially all, of the anode perimeter along another track that partially overlaps the prior track as described above. Alternately, different tracks can partially overlap along one or more portions of the anode perimeter but completely overlap along one or more other portions of the anode perimeter.

Although the laser pathway in FIG. 5G is illustrated as having two tracks, the laser pathway can include a single track or more than two tracks. During the laser cutting process, a track can be followed once or more than once. For instance, when a laser pathway includes two tracks as is shown in FIG. 5G, the laser can alternate between different tracks on subsequent passes. As an example, the laser can follow the first track 59, the second track 60, the first track 59, the second track 60, and so on until the trench extends through the sheet of material 50 and the anode precursor is extracted from the sheet of material 50.

Figure 5H:
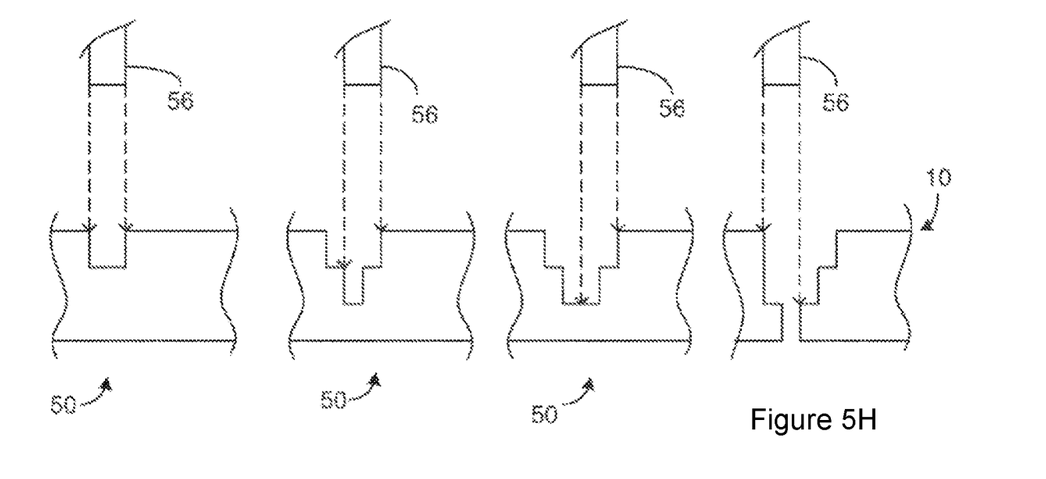
FIG. 5H illustrates tracks selected so as to provide an edge of an anode with the desired shape.

The tracks can be selected so as to provide the edges of the anode with the desired taper and/or shape as described in the context of FIG. 3C. For the purpose of illustration, FIG. 5H illustrates tracks selected so as to provide an anode with a linearly tapered edge although other shapes are possible. FIG. 5H shows four different images that each includes a cross section of the same part of the sheet of material 50. In each image, a laser is positioned over the sheet of material 50. Each of the images represents a different track. The arrows indicate where the light is incident on the sheet of material 50 as the laser is moved along the track associated with that image. The sheet of material 50 shows the portion of the sheet of material 50 that remains after the laser have removed a portion of the sheet of material 50. As is evident from the rightmost image, the tracks have been selected such that the laser cuts through the sheet of material 50 and also provides an anode with a tapered edge. Although the illustrated taper is a linear taper, the taper need not be linear.

In some instances, the anode precursor is fabricated using one, two, three, four, five or six parameters selected from the group consisting of a laser pulse duration, pulse frequency, power density, scan rate, pass interval, and pass number where the laser pulse duration is 400 femtoseconds, the laser pulse frequency is 400 kHz, the power density is $7.99 \times 10^{11}$ W/cm$^2$, the scan rate is 720 mm/sec, the pass interval is 0.25 s, and the pass number is 60.

The inventors have found that using a laser to extract one or more anode precursors from the sheet of material 50 can convert at least a portion of the first phase of the dielectric 20 to the second phase of the dielectric. For instance, using a laser to cut a sheet of material 50 having fused particles 18 with aluminum cores and the boehmite phase of aluminum oxide ($Al_2O_3$) as the dielectric can convert the boehmite phase of aluminum oxide to the second phase of the aluminum oxide (alpha-corundum oxide, $\alpha$-$Al_2O_3$). This conversion is believed to be a result of the heat generated during the laser cutting process. As a result, the conversion primarily occurs at and/or near the edge of the anode precursor. As noted above, the second phase of the anode metal oxide is often undesirable. For instance, the second phase of the anode metal oxide can be more electrically conductive than the first phase of the anode metal oxide. As an example, the alpha corundum oxide ($\alpha$-$Al_2O_3$) phase of aluminum oxide has properties of a semiconductor. As a result, the alpha phase corundum oxide ($\alpha$-$Al_2O_3$) is not suitable for use as a dielectric and is accordingly associated with undesirably high levels of leakage and deformation. However, alpha phase corundum oxide ($\alpha$-$Al_2O_3$) is very stable and is difficult to convert back into the boehmite phase of aluminum oxide. While adjustments to the laser cutting parameters disclosed above can partially address the leakage and deformation associated with the this conversion from the first phase of the anode metal oxide to the second phase of the anode metal oxide, an oxide extraction phase discussed in more detail below can further reduce the leakage and deformation caused by this conversion.

The one or more anode precursors constructed having fused particles 18 according to FIG. 5C, or FIG. 5D or FIG. 5E are included in a capacitor precursor according to FIG. 3A through FIG. 3C. For instance, one or more of the anode precursors are combined with one or more separators 34 and one or more cathodes so as to form an electrode assembly 32 with the components arranged as disclosed in the context of FIG. 3A through FIG. 3C. The electrode assembly 32 is placed in a capacitor case 36 along with the electrolyte. Any electrical connections needed for operation of the capacitor precursor are made before and/or after the electrode assembly 32 is placed in the capacitor case 36 and the capacitor case 36 is sealed.

The capacitor precursor can optionally be put through an aging phase. The aging phase can be configured to form an anode metal oxide on any anode metal that is exposed at the at the walls of the conduits 16 as shown in FIG. 5C or FIG. 5D and/or at the edges of the one or more anode precursors in the capacitor and/or at the edges of the anode precursor as a result of laser cutting an anode precursor such as anode precursors constructed according to FIG. 5C or FIG. 5D, or FIG. 5E. The aging process can use water in the electrolyte to form the anode metal oxide. The phase of the anode metal oxide formed during the aging phase is not necessarily the same as the first phase of the anode metal oxide and/or the second phase of the anode metal oxide. For instance, when the anode metal is aluminum, the anode metal oxide formed during the aging phase is not the first phase (boehmite phase) but is similar.

Suitable methods for aging the capacitor precursor include, but are not limited to, holding the capacitor at an elevated temperature while charged. For instance, in some instances, aging includes holding the capacitor at a temperature greater than 50° C. or 70° C. and/or less than 100° C. or 200° C. for a time greater than 2 hours, or 20 hours, and/or less than 50 hours or one hundred hours while charged to a voltage greater than 50 V, or 200 V and/or less than 600 V or 800 V. In one example, aging includes holding the capacitor at about 85° C. for 24 to 36 hours while charged to about 400 V.

An oxide phase extraction can be performed on the capacitor precursor 61. The oxide phase extraction can include an oxide removal stage that removes all or a portion of the second phase of the anode metal oxide from the anode precursor and/or from the portion of the sheet of material 50 that serves as the anode precursor. Accordingly, the oxide removal stage can remove the second phase of the anode metal oxide in the anode precursor of FIG. 5C and/or that is positioned at the edges of the anode precursor as a result of laser cutting an anode precursor such as an anode precursor constructed according to FIG. 5C or FIG. 5D, or FIG. 5E.

In some instances, the oxide phase extraction moves all or a portion of the second phase of the anode metal oxide from the anode precursor into the electrolyte. The oxide phase extraction can be performed such that the first phase of the anode metal oxide remains intact or remains substantially intact. The oxide phase extraction can also include an oxide restoration stage that forms the anode metal oxide on exposed anode metal and/or on areas where the anode metal oxide is thin. The phase of the anode metal oxide formed during the oxide restoration stage can be the first phase of the anode metal oxide. As a result, the oxide restoration stage can restore the first phase of the anode metal oxide in places where the first phase and/or second of the anode metal oxide was removed or damaged during the oxide removal stage. Suitable methods for the oxide restoration stage can be the same or similar to the methods used in the aging phase.

An example oxide phase extraction includes one or more cycles. Each cycle can include the oxide removal stage followed by the oxide restoration phase. When the oxide phase extraction includes multiple cycles, the cycles can be repeated in series. An example oxide phase extraction includes a high temperature stage that acts as an oxide removal stage followed by a low temperature stage and a charging stage. The low temperature stage can be performed between the high temperature stage and the charging stage. The high temperature stage can be configured to move all or a portion of the second phase of the anode metal oxide from the anode precursor and into the electrolyte. The low temperature stage can be configured to form the first phase of the anode metal oxide on any anode metal that becomes exposed during the high temperature stage. The charging stage causes a current surge through the anode precursor that reforms the anode metal oxide. For instance, the charging stage can form the first phase of the anode metal oxide on the anode precursor from oxygen in the electrolyte. Accordingly, the low temperature stage and the charging stage together can serve as an oxide restoration stage.

An example of a single cycle of the oxide phase extraction includes a high temperature stage where the capacitor precursor is exposed to a temperature $T_1$ for a time period $P_1$; a low temperature stage where the capacitor precursor is exposed to a temperature $T_2$ for a time period $P_2$; and a charging stage where the capacitor precursor is charged to $V_1$ and discharged. The cycle of the oxide phase extraction can be performed N times.

Examples of suitable $T_1$ include, but are not limited to, $T_1$ greater than 45° C., or 50° C. and/or less than 90° C. or 100° C. In some instances, prolonged exposure of the capacitor to temperatures above 90° C. can damage one or more components of the capacitor. Examples of suitable $P_1$ include, but are not limited to, $P_1$ greater than 0.5 hours and/or less than 2 days. The variables $T_1$ and $P_1$ can be a function of materials and/or configuration. Additionally, the value of $P_1$ can be a function of $T_1$. Exposure of a capacitor precursor 61 to increased temperatures for prolonged periods of time can damage the capacitor precursor components. As a result, as $T_1$ increases, it is generally desirable to reduce the value of $P_1$. For example, when $T_1$ is above 85° C., $P_1$ can be less than 2 hours but when $T_1$ is below 50° C., $P_1$ can be more than 1 day.

Examples of suitable $T_2$ include, but are not limited to, $T_2$ greater than 35° C., or 45° C. and/or less than 50° C. or 70° C. Examples of suitable $P_2$ include, but are not limited to, $P_2$ greater than 10 minutes and/or less than 100 minutes or one day. In some instances, $T_1$ is higher than $T_2$ but $P_1$ is longer than $P_2$. Examples of suitable $V_1$ include, but are not limited to, $V_1$ greater than 200 V, 400V and/or less than 500V or 600V. Examples of suitable N include, but are not limited to, N greater than 0, 1, or 8 and/or less than 15, 25, or 35.

An example of the oxide phase extraction includes any one, any two, any three, any four, any five, or any six features selected from the group consisting of $T_1$ greater than 45° C., or 50° C. and/or less than 90° C. or 100° C., $P_1$ greater than 0.5 hours and/or less than 2 days, $T_2$ greater than 35° C., or 45° C. and/or less than 50° C. or 70° C., $P_2$ greater than 10 minutes and/or less than 100 minutes or one day, $V_1$ greater than 200 V, 400V and/or less than 500V or 600V. In some instances, this oxide phase extraction is performed for a number of cycles, N, greater than 0, 1, or 8 and/or less than 15, 25, or 35.

When the cores 22 include aluminum as the anode metal and the first phase of the anode metal oxide is the boehmite phase of aluminum oxide, an example of a cycle the oxide phase extraction includes a high temperature stage where the capacitor precursor is placed in a 90° C. (+/−5° C.) oven for 1 hour (+/−5 min); a low temperature stage where the capacitor precursor is placed in a 37° C. (+/−5° C.) oven for 30 minutes (+/−5 min); a charging stage where the capacitor precursor is charged to 422.5 Volts and discharged. To execute the oxide phase extraction, this cycle of the oxide phase extraction can be performed once or sequentially repeated for 1 or more cycles to 35 or fewer cycles. The total number of cycles performed can be a function of the capacitor response to the preceding cycles. For instance, performance of additional cycles can be optional or skipped once the time needed to charge the capacitor after a cycle is less than a threshold. In one example, the threshold is 5% of the time needed to charge the capacitor before the cycle.

The exact number of cycles needed can be a function of the properties of the sheet of material 50 and the thermal effect of laser cutting on the edge. As a result, the number of cycles that are performed can be variable. For example, the time needed to charge the capacitor precursor can be measured after each cycle. The measured charge time can be compared to a charge time threshold. If the charge time for cycle j exceeds the threshold, then an additional cycle can be performed. When the charge time for cycle j falls below the threshold, additional cycles are not performed. For instance, the threshold can be a percentage of the time needed to charge the capacitor after the immediately preceding cycle. In one example, the threshold is 5% of the time needed to charge the capacitor before the cycle.

Completion of the oxide extraction phase provides the anode and capacitor of FIG. 3A through FIG. 3C. Accordingly, the capacitor is ready for use in the desired application and/or for resale.

Figure 6:
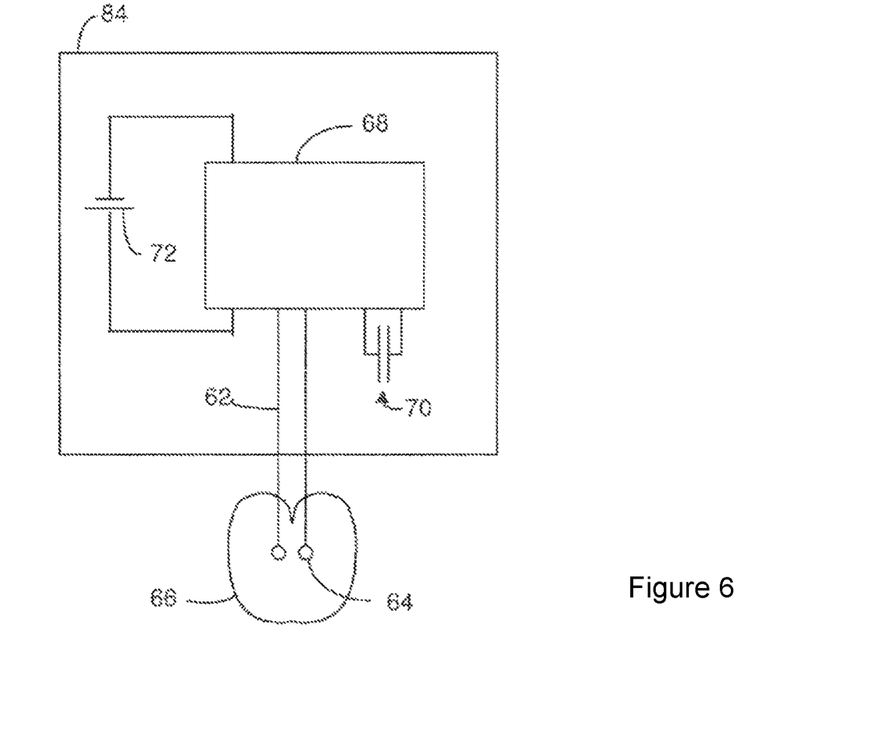
FIG. 6 is a schematic diagram of a defibrillation system that includes an Implantable Cardioverter Defibrillator (ICD) that employs one or more capacitors constructed according to FIG. 1A through FIG. 5H.

The above capacitors can be used in medical devices such as an Implantable Cardioverter Defibrillator (ICD). FIG. 6 is a schematic diagram of a defibrillation system that includes an Implantable Cardioverter Defibrillator (ICD) that employs one or more capacitors constructed as disclosed above. The defibrillation system includes lead lines 62 connected to electrodes 64 in contact with the heart. Although the defibrillation system is shown with two electrodes 64, the defibrillation system may include three or more electrodes 64 and/or three or more lead lines. The specific positions of the electrodes 64 relative to the heart 66 is dependent upon the requirements of the patient.

The defibrillation system also includes a processing unit 68. The lead lines 62 provide electrical communication between the processing unit 68 and the electrodes 64. The processing unit 68 is also in electrical communication with one or more capacitors constructed as disclosed above.

The processing unit 68 receives power from a battery 72. The processing unit 68 can place the battery 72 in electrical communication with the one or more capacitors 70. For instance, the processing unit 68 can cause the battery 72 to charge the one or more capacitors 70. Additionally, the processing unit 68 can place the one or more capacitors 70 in electrical communication with the lead lines 62. For instance, the processing unit 68 can cause the one or more capacitors to be discharged such that electrical energy stored in the one or more capacitors is delivered to the heart through all or a portion of the electrodes 64. The processing unit 68, the battery 72 and the one or more capacitors 70 are positioned in a case 84.

During operation of the defibrillation system, the defibrillation system employs output from the lead lines 62 to monitor the heart and diagnose when defibrillation shocks should be provided. When the processing unit 68 identifies that defibrillation shocks are needed, the processing unit 68 provides the heart with one or more defibrillation shocks. To provide a defibrillation shock, the processing unit 68 employs energy from the battery 72 to charge the one or more capacitors 70. Once the one or more capacitors are charged, the processing unit 68 causes these capacitors to be discharged such that energy stored in the capacitors is delivered to the heart through all or a portion of the electrodes 64 in the form of defibrillation shocks. During the defibrillation shocks, the defibrillator requires that one or more pulses be delivered from the battery 72 to the one or more capacitors. Each pulse is generally associated with a defibrillation shock. The duration of each pulse is generally about 8 to 12 seconds with the pulses separated by a delay time that is based on how fast the battery charges the capacitor and determining the appropriate point to provide the defibrillation shock.

Suitable processing units 68 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 68 has access to a memory that includes instructions to be executed by the processing unit 68 during performance of the control and monitoring functions.

The sequence of events disclosed above for forming an anode can be performed in a sequence other than the disclosed sequence. For instance, the oxide phase extraction can be performed on an anode precursor(s) before the capacitor is assembled.

Although the above methods of forming an anode have been disclosed in the context of a capacitor, the above oxide phase extraction can also be applied to the fabrication of anodes, cathodes, positive electrodes, and/or negative electrodes in batteries.

Although the above methods of forming the capacitor makes use of anodes having edges tapered by laser cutting, the corresponding cathodes can also include tapered edges as shown in FIG. 3A. The edges of the cathodes can be shaped using a laser as described above and/or by other shaping mechanisms.

Although the electrode assembly 32 is disclosed in the context of anodes alternating with cathodes other electrode arrangements are possible as is known in the capacitor and battery arts.

Although not shown above, portions of the anode current collector 14 that are exposed while forming oxide at one or more points in the fabrication process may also be converted to an oxide of the anode current collector 14 material. These regions of oxide in the anode current collector 14 can prevent the electrolyte from coming into direct contact with the electrically conducting portions of the anode current collector 14.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of fabricating a capacitor, comprising:
   forming conduits in a porous layer of material,
      the porous layer of material having particles that each includes a dielectric on a core,
      the formation of the conduits causing a portion of the dielectric to convert from a first phase to a second phase; and
   removing at least a portion of the second phase of the dielectric from the porous layer of material.

2. The method of claim 1, wherein the first phase is boehmite and the second phase is alpha phase corundum.

3. The method of claim 1, wherein at least a portion of the converted second phase is located in the conduits.

4. The method of claim 1, wherein removing the second phase of the dielectric includes immersing at least a portion of the layer of material in an electrolyte solution that includes a chloride.

5. The method of claim 1, wherein removing the second phase of the dielectric includes immersing at least a portion of the layer of material in an electrolyte solution that includes a nitrate.

6. The method of claim 5, wherein the nitrate is aluminum nitrate.

7. The method of claim 1, wherein removing the second phase of the dielectric includes etching the second phase of the dielectric.

8. The method of claim 7, wherein etching the second phase of the dielectric is done with an etchant selected such that the dielectrics on the particles acts as a mask that protects the cores from the etchant.

9. The method of claim 7, wherein etching the second phase of the dielectric includes performing a wet etch.

10. The method of claim 1, wherein removing the second phase of the dielectric includes removing the second phase from within the conduits.

11. The method of claim 10, wherein removing the second phase from within the conduits includes widening of the conduits.

12. The method of claim 11, wherein widening the conduits includes etching the conduits.

13. The method of claim 1, further comprising: forming the dielectric in an interior of the conduits after removing the second phase from within the conduits.

14. The method of claim 13, wherein the dielectric formed in the interior of the conduits is the first phase of the dielectric.

15. The method of claim 1, wherein forming the conduits includes laser drilling of the conduits.

16. The method of claim 1, wherein the conduits are arranged on the layer of material in a periodic two-dimensional pattern.

17. The method of claim 16, wherein the periodic two-dimensional pattern is a hexagonal pattern.

18. The method of claim 1, wherein an average width of the conduits is more than 2 times an average width of the pores.

19. The method of claim 1, wherein the conduits each has a length and the conduits are straight along their length.

20. The method of claim 1, wherein the second phase of the dielectric is removed from the cores such that cores are exposed such that the cores define an interior wall of the conduits; and
   further comprising: forming the dielectric on the exposed cores in the interior of the conduits after removing the second phase from within the conduits.

* * * * *